United States Patent [19]

Goering

[11] 3,837,285
[45] Sept. 24, 1974

[54] OPEN TUBE GUIDEWAY FOR HIGH-SPEED AIR-CUSHIONED VEHICLES

[75] Inventor: Rodney S. Goering, Columbus, Nebr.

[73] Assignee: The United States of America as represented by the Administrator of the National Aeronautics and Space Administration, Washington, D.C.

[22] Filed: Jan. 26, 1972

[21] Appl. No.: 220,785

[52] U.S. Cl. .......... 104/23 FS, 238/134, 104/138 R
[51] Int. Cl............................................. B61b 13/08
[58] Field of Search ............ 104/23 FS, 138 R, 140, 104/134; 238/134, 135

[56] References Cited
UNITED STATES PATENTS

| 3,100,454 | 8/1963 | Dennis | 104/23 FS |
| 3,238,894 | 3/1966 | Maksim | 104/23 FS |
| 3,675,582 | 7/1972 | Girard | 104/23 FS |

FOREIGN PATENTS OR APPLICATIONS

| 1,264,041 | 11/1961 | France | 104/138 R |

Primary Examiner—M. Henson Wood, Jr.
Assistant Examiner—D. W. Keen
Attorney, Agent, or Firm—Howard J. Osborn; John R. Manning

[57] ABSTRACT

This invention is a tubular shaped guideway for high-speed air-cushioned supported vehicles. The tubular guideway is split and separated such that the sides of the guideway are open. The upper portion of the tubular guideway is supported above the lower portion by truss-like structural members. The lower portion of the tubular guideway may be supported by the terrain over which the vehicle travels, on pedestals or some sililar structure.

10 Claims, 2 Drawing Figures

OPEN TUBE GUIDEWAY FOR HIGH-SPEED AIR-CUSHIONED VEHICLES

ORIGIN OF THE INVENTION

The invention described herein was made by an employee of the United States Government and may be manufactured and used by or for the Government for governmental purposes without the payment of any royalties thereon or therefor.

BACKGROUND OF THE INVENTION

1. Field of the Invention

This invention relates to a tubular shaped guideway having open sides to provide a travel medium for high-speed air-cushioned supported vehicles. It has particular utility in the field of ground transportation.

2. Description of the Prior Art

The use of air-cushioned supported vehicles and guides therefor are known in the art. For example, the Hafner Pat. Nos. 3,108,546 and 3,155,050 relate to vehicles traveling on an air cushion wherein a guideway for the vehicle is provided to produce predetermined air current and pressure conditions. However, the Hafner patents teach that the air-cushioned vehicle should operate within a closed tubular guideway which is disadvantageous because an enclosed tubular guideway introduces compression of the air in the path of the vehicle, which is commonly known as a piston effect. The Bertin et al. Pat. No. 3,190,235, discloses a substantially rectangular guideway having an open top and requires the use of guide rails or slots. The McGovern Pat. No. 3,329,069 also relates to a combination of vehicle and track therefor, which comprises an open helical guideway for vehicles including blunt, flexible blade studs in the guideway. This type of guideway is not practical for use with an air-cushioned vehicle.

SUMMARY OF THE INVENTION

These and other defects and disadvantages of the prior art are solved by the instant invention which provides a tubular guideway structure having open sides to function as a travel medium for high-speed air-cushioned vehicles. The guideway according to applicant's invention is basically a tubular structure having semi-circular top and bottom cross section portions tied together with rigid diagonal lacing or other types of shear connectors. The shear connectors effectively provide open sides for the guideway through which air may escape to minimize the piston effect associated with closed tubular guideways and which further provides the passengers with a view of the environment. The top portion of the guideway comprises a cover for the vehicle and functions as a main part of the structural aspect of the guideway.

The guideway according to the invention is planned to replace several guideway concepts, some of which are now in operation, including the inverted tee, double ell, and box beam. Each of these obvious disadvantages: (1) they each require an independent cover to protect against weather and vandalism; (2) each has the problem of requiring superelevation on horizontal curves to keep the accelerations from building up horizontally, and at low speeds this superelevation tends to cause discomfort because of the horizontal component of gravity relative to the vehicle's orientation.

DETAILED DESCRIPTION OF THE INVENTION

Figure 1:
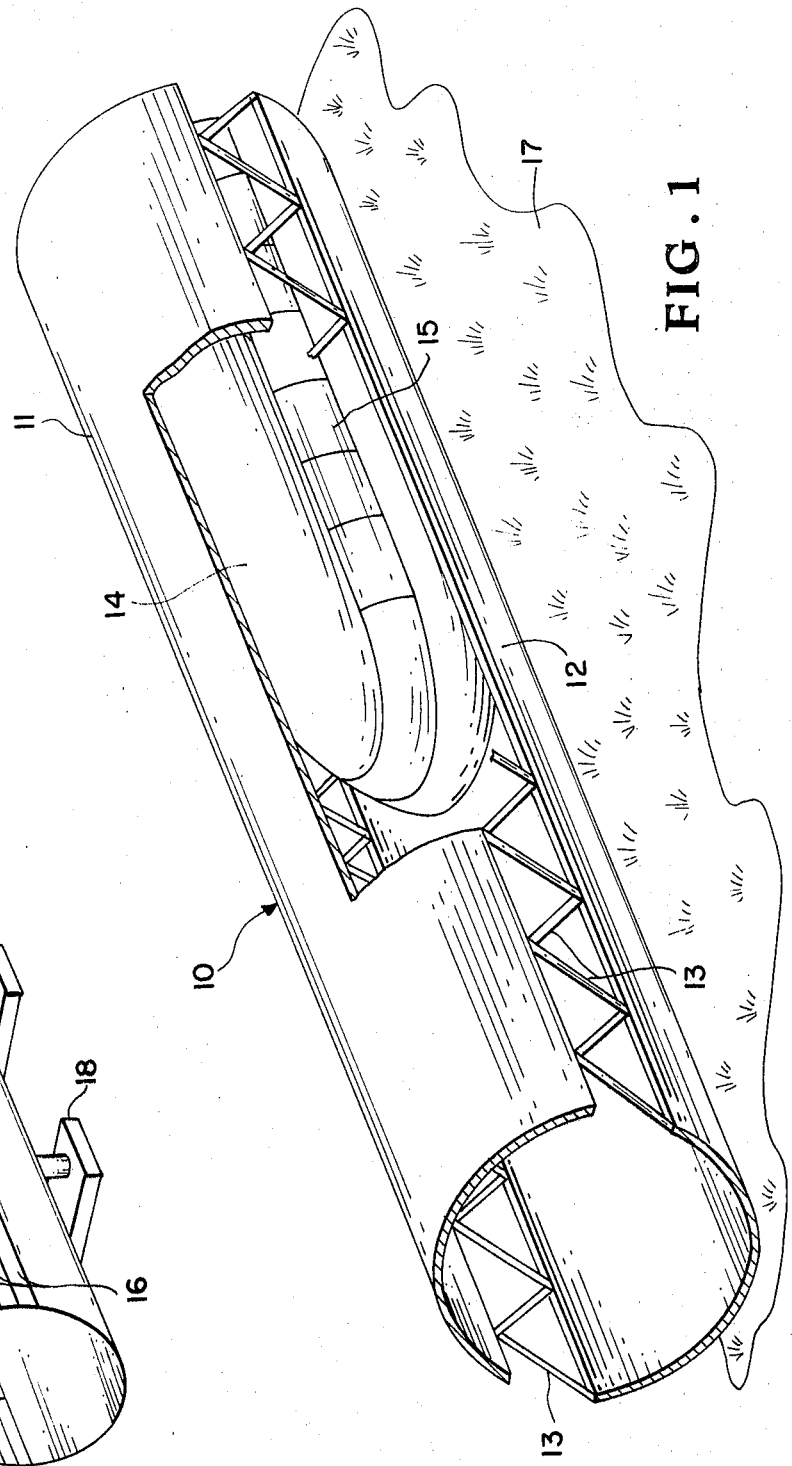
FIG. 1 is an isometric view illustrating the guideway for an air-cushioned vehicle according to the invention.

FIG. 1 shows a guideway or track 10 having top and bottom semi-circular cross section portions 11 and 12, respectively. The top and bottom semi-circular portions 11 and 12 are joined together in the longitudinal direction at their sides by diagonal lacing 13 or other types of shear connectors, to effectively define a guideway having open sides. The air-cushioned vehicle 14 rides within guideway 10, and comprises windows 15 coincident in elevation with connectors 13 in order that passengers may view the environment from the so defined open sides of the guideway and permit air to escape from the guideway to minimize the piston effect. The top semi-circular portion 11 is partially cut away so as to illustrate the position of the air-cushioned vehicle 14 within the guideway.

The guideway can be elevated upon pedestals 18 with or without the addition of suspension cables or it can be placed on grade 17. The top and bottom semi-circular portions are relatively thin and may be fabricated from a wide variety of materials, including a combination of corrugated and smooth sheet metal, precast concrete, pre-stressed concrete, or any other suitable materials.

Figure 2:
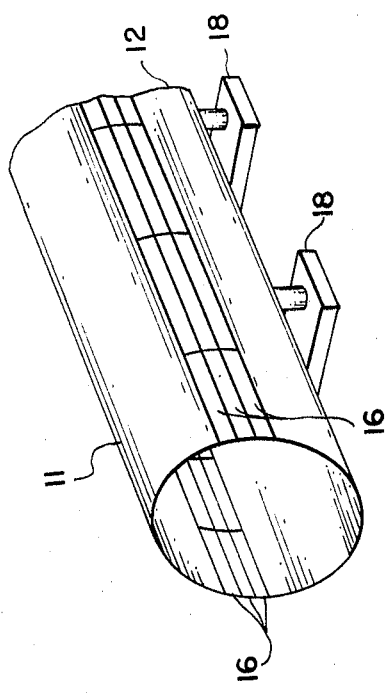
FIG. 2 is an isometric view illustrating part of the guideway having side louvers.

FIG. 2 shows a portion of the guideway 11 with louvers 16 added in the longitudinal direction between the sides of the top and bottom semi-circular portions 11 and 12 which may be opened or closed by conventional means (not shown) as desired to increase protection from weather, although this does restrict the passengers' view. The following advantages result from applicant's invention:

1. it is economical because of the efficient use of materials whereby the cover comprises the top semi-circular portion of the guideway structure resulting in high strength/weight ratio;
2. the low pressure of the air cushion is used advantageously by having a relatively thin running surface;
3. the geometry of the system provides a large moment of inertia/weight ratio resulting in reduced deflection under load and a high natural frequency. This increases the riding quality of the transportation system;
4. the curved surface of the guideway reduces the alignment tolerance required for the vehicle-guideway interface;
5. the curved surface provides a self-adjusting superelevation because the vehicle can be designed to simply ride up the side of the guideway on horizontal curves;
6. the top of the guideway provides a cover as protection from inclement weather as well as vandals;
7. the open sides of the guideway allow the air to escape from the guideway as the vehicle passes which minimizes the piston effect normally associated with enclosed tubular guides;
8. the open sides of the guideway provide a view for passengers and should avoid any uneasiness experienced in a closed system;

9. the vehicle wind load is reduced because the guideway provides considerable shelter thereagainst.

What is claimed as new and desired to be secured by Letters Patent of the United States is:

1. A guideway for an air-cushioned vehicle comprising:

top and bottom spaced semi-circular cross section vehicle guide portions defining a tubular structure with each longitudinal side of the top portion being positioned opposite a longitudinal side of the bottom portion;

rigid connector means connected between the oppositely positioned longitudinal sides of the top and bottom portions, the connector means being sufficiently interspaced so that the tubular structure defines substantially open first and second sides on opposite sides thereof to permit air to escape from the internal part of the tubular structure.

2. A guideway for an air-cushioned vehicle as recited in claim 1 wherein the connector means comprise a series of rigid diagonal lacing connected between the longitudinal sides of the upper and lower portions.

3. A guideway for an air-cushioned vehicle as recited in claim 2 wherein the vehicle has windows located at an elevation substantially coextensive with the substantially open first and second sides to permit the passengers to view the environment.

4. A guideway as recited in claim 3 further comprising:

louver means connected to the oppositely positioned longitudinal sides of the top and bottom portions which may be selectively opened and closed dependent upon outside weather conditions.

5. A guideway as recited in claim 4 elevated upon pedestals.

6. A guideway as recited in claim 4 positioned on grade.

7. A guideway as recited in claim 1 elevated upon pedestals.

8. A guideway as recited in claim 1 positioned on grade.

9. A guideway as recited in claim 1 further comprising means defining the geometry of the guideway to provide a large moment of inertia/weight ratio to reduce deflection under load and produce a high natural frequency.

10. A guideway as recited in claim 1 further comprising means to allow the vehicle to ride upon the sides of the semi-circular cross section bottom portion on horizontal curves to provide a self-adjusting superelevation.

* * * * *